(12) United States Patent
Schwartz

(10) Patent No.: US 6,820,335 B2
(45) Date of Patent: Nov. 23, 2004

(54) COMPONENT BONDING PROCESS

(75) Inventor: Henry R. Schwartz, Storrs, CT (US)

(73) Assignee: United Technologies Corporation, Hartford, CT (US)

( * ) Notice: Subject to any disclaimer, the term of this patent is extended or adjusted under 35 U.S.C. 154(b) by 387 days.

(21) Appl. No.: 09/981,100

(22) Filed: Oct. 16, 2001

(65) Prior Publication Data

US 2003/0070295 A1 Apr. 17, 2003

(51) Int. Cl.[7] .............................................. B21D 53/78
(52) U.S. Cl. ...................... 29/889.72; 29/458; 148/527; 148/518
(58) Field of Search ........................... 29/889.72, 889.7, 29/424, 458, 460, 527.2; 148/671, 669, 516, 518, 527; 228/193; 134/2, 3, 29, 41, 22.17; 416/213 R, 229 A

(56) References Cited

U.S. PATENT DOCUMENTS

| | | | |
|---|---|---|---|
| 4,405,427 A | * | 9/1983 | Byrd |
| 4,439,241 A | * | 3/1984 | Ault et al. |
| 4,713,120 A | * | 12/1987 | Hodgens, II et al. |
| 4,834,912 A | * | 5/1989 | Hodgens, II et al. |
| 5,063,662 A | | 11/1991 | Porter et al. |
| 5,268,045 A | * | 12/1993 | Clare |
| 6,132,520 A | * | 10/2000 | Schilbe et al. |
| 6,427,904 B1 | * | 8/2002 | Groll |

\* cited by examiner

Primary Examiner—Michael J. Carone
Assistant Examiner—T. Nguyen
(74) Attorney, Agent, or Firm—Bachman & LaPointe

(57) ABSTRACT

A method for bonding metal components includes the steps of providing metal components to be bonded together at contacting surfaces, the contacting surfaces having an oxide layer; washing the components with an alkali solution to provide alkali-washed components; washing the alkali-washed components with water to provide water-washed components; and bonding the components together at the surfaces.

10 Claims, 1 Drawing Sheet

COMPONENT BONDING PROCESS

BACKGROUND OF THE INVENTION

The invention relates to a method for bonding components such as hollow fan blade components and the like which eliminates certain steps so as to provide a more environmentally friendly method.

Fan blade components and the like are typically manufactured or machined in pieces which must then be assembled and bonded together. U.S. Pat. No. 5,063,662 discloses a method of forming a hollow blade, and describes the process for bonding components. Typically, such components are machined to provide desired shapes and contours, and must then be cleaned as disclosed in the aforesaid patent such that good bonding can result.

FIG. 1 also schematically illustrates a typical conventional process. As shown, after machining, components are conventionally treated in an anodizing step which places an oxide coating on surfaces of the components. This oxide coating is conventionally believed to interfere with obtaining a good bond, and the component is therefore processed with a series of steps to remove the oxide layer before bonding. Still referring to FIG. 1, after anodizing, the component is acid etched so as to highlight grains in the component, which assists in detecting any flaws. Following this acid etch, the component is washed using water, and inspected for defects. At this stage, the component still has an oxide coating from the anodizing step, and as shown in FIG. 1, the component is then subjected to a pickling step using an acid wash to backstrip or remove the oxide layer, followed by an alkali washing step to remove grease, oil and the like, and then a final wash using demineralized water so as to preserve the oxide-removed surface and provide the part with surfaces suitably prepared for bonding.

The method of FIG. 1, and also methods described in the '662 patent, do provide a final bonded assembly having excellent bond quality, typically greater than 99%. However, the acid backstrip step results in a large quantity of environmentally hazardous and unfriendly materials which must be disposed of. Such acid streams also add to the overall cost of the process due to needs for special handling and disposal. Further, the need for demineralized water washing leads to additional waste materials, typically from sodium hydroxide or hydrochloric acid used to de-ionize the water for this step.

The need for environmentally friendly processes and techniques is well known, and it is clear that the need remains for a method for bonding components which reduces environmental impact while nevertheless providing a bonded assembly which is of sufficient quality.

It is therefore the primary object of the present invention to provide such a method.

It is a further object of the present invention to provide a method for bonding components which reduces costs of various processing steps.

Other objects and advantages of the present invention will appear hereinbelow.

SUMMARY OF THE INVENTION

In accordance with the present invention, a method is providing for bonding metal components, which method comprises the steps of providing metal components to be bonded together at contacting surfaces, said contacting surfaces having an oxide layer; washing said components with an alkali solution to provide alkali-washed components; washing said alkali-washed components with water to provide water-washed components; and bonding said components together at said surfaces.

In accordance with the present invention, the acid backstripping step conventionally believed to be necessary is avoided, and bonding is accomplished using oxide-coated surfaces, while nevertheless providing a bond which is of sufficient quality so as to readily exceed required levels.

This advantageously allows for the use of tap water rather than demineralized water in the final washing step, and reduces the amount of environmentally hazardous materials generated by the process.

BRIEF DESCRIPTION OF THE DRAWINGS

A detailed description of preferred embodiments of the present invention follows, with reference to the attached drawings, wherein.

DETAILED DESCRIPTION

The invention relates to a method for bonding components such as fan blade components and the like, which components are typically made of metal or metal alloys, for example titanium materials, and specifically titanium alloys with vanadium and aluminum.

Figure 1:
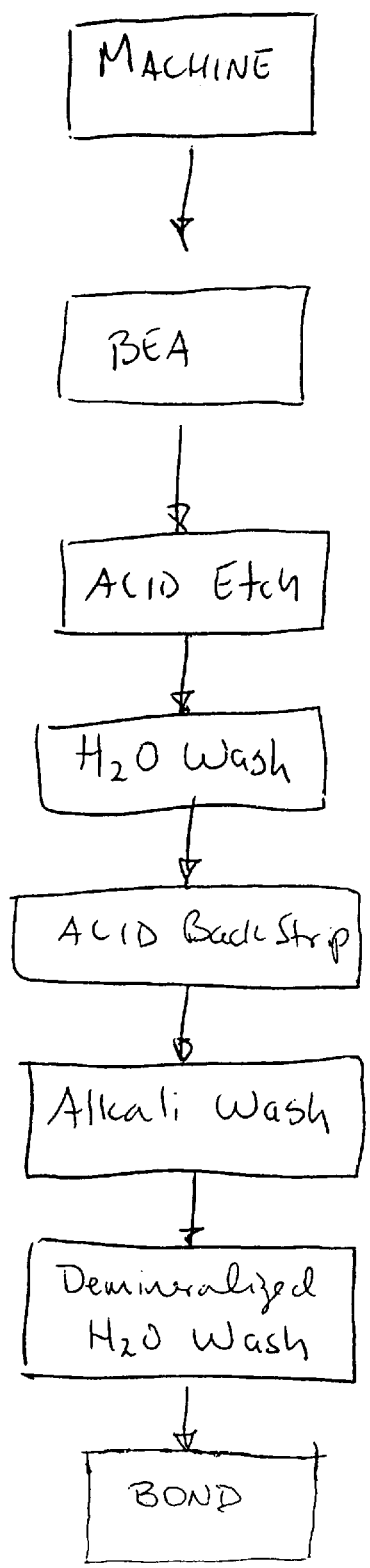
FIG. 1 schematically illustrates a conventional method for bonding.

FIG. 1 illustrates a prior art method, wherein it is shown that conventional processes, based upon the belief that removal of an oxide layer from the components, before bonding, is necessary, provides for an acid backstrip step to remove this oxide layer, and further to wash the components, following alkali wash, with demineralized water so as to avoid any re-introduction of oxides to or other contamination of the component. As discussed above, by following these steps, it is conventionally believed that the surfaces of the components must be prepared in this way so as to provide a good quality bond.

In accordance with the present invention, it has surprisingly been discovered that components from the anodizing process, with oxide layers thereon, can be etched and washed for inspection as usual, and then passed directly to an alkali wash and water wash step using tap water or any other readily available source of water, and that a resulting bond possesses excellent bond quality. The process of the present invention advantageously provides a bond having a bond quality, measured in terms of percent (vol.) free of porosity, of at least 98%, more preferably at least 99%. This is particularly surprising in light of the conventionally well-accepted requirement of the acid backstrip step of the prior art, and is a significant improvement over such conventional methods by providing for a substantial reduction in the amount of acid stream generated by the method which, of course, must be disposed of properly.

Figure 2:
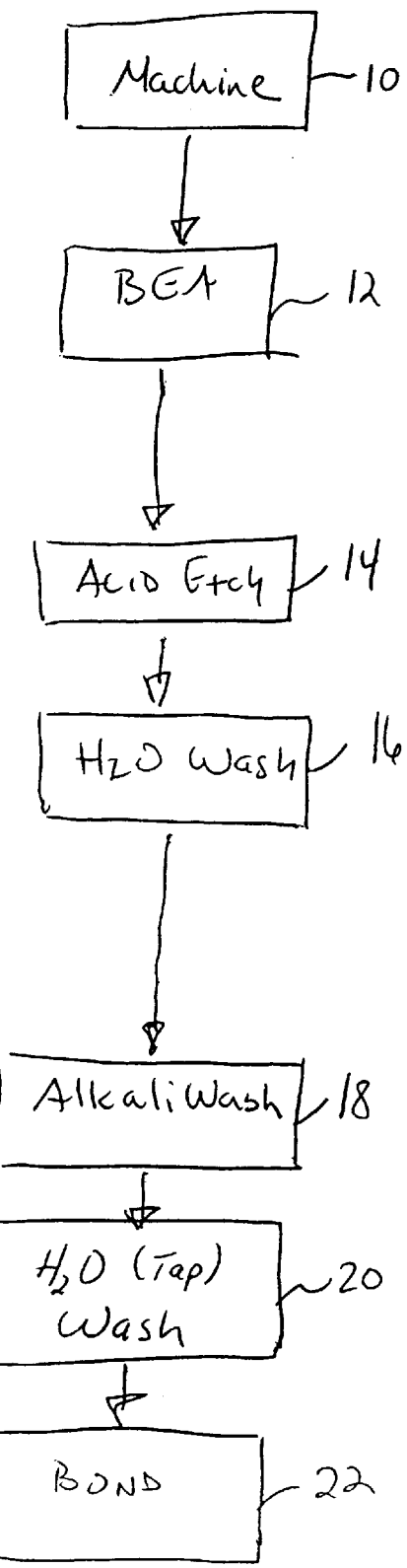
FIG. 2 schematically illustrates a method in accordance with the present invention.

FIG. 2 schematically illustrates the method of the present invention. As shown, a component is passed to a machining step 10 wherein various contours and other desired features are machined into the component. Following this step, the machined component is passed to an anodizing step 12, wherein the component is "blue etch anodized", so as to provide the component having an anodized surface which includes a layer of oxides.

The component is then passed to an acid etch step 14, which serves to raise grains in the component and highlight flaws to facilitate subsequent inspection. Following acid etch, the component is washed with water of any appropriate source, as shown by H$_2$O washing step 16 of FIG. 2, so as to provide a component with oxide layer positioned thereon which can be inspected for any readily visible flaws before further processing.

In accordance with the present invention, and advantageously, following inspection, the component is then passed directly to an alkali washing step 18 wherein the component is washed for removal of grease or oil and the like. This alkali wash step does not remove the oxide coating, such that the component following alkali washing step 18 has alkali-washed surfaces which still bear the oxide layer from the anodizing step. These components are then passed to a further water washing step 20, and this step can advantageously be carried out using any source of water, including tap water, since the oxide layer has been left in place. The components are then passed to a conventional bonding process 22, typically a diffusion bonding process, where the components are bonded together at mating surfaces as desired.

In accordance with the present invention, it has been found that components bonded in accordance with the method disclosed herein provide for a bond quality greater than 98%, which exceeds all current requirements. Further, this bond quality is provided with a substantial reduction in acid and other materials requiring disposal, since the acid backstrip step of the prior art is completely avoided and the final water wash step is simplified, such that no materials are needed to prepare de-ionized or demineralized water.

It should readily be appreciated that this is particularly advantageous from an environmental standpoint by reducing the amount of acid which must be disposed, and further that this method is advantageous in reducing cost due to reduced quantities of materials needed, broadening of suitable sources of water for the washing step, and reduction in materials used to treat such water.

As step forth above, this method is useful with various components for engines, particularly for components which must be bonded together, such as hollow fan blade components and the like. Further, this method is particularly well suited for use with titanium-based components, such as titanium-vanadium-aluminum components, typically having 6% weight vanadium and 4% weight aluminum, for example. Of course, the method is suitable for use with other metals and alloys as well.

The acid used in both the conventional and present methods would typically be hydrochloric acid, and the chemical waste stream of hydrochloric acid which is eliminated is significant from both a cost and environmental standpoint. A substantial reduction in waste lye or sodium hydroxide is also provided, and due to reduction in these streams, there is a significantly reduced need for stack and air scrubbers and the like, providing for still further reductions in cost.

Suitable alkali washing materials include any general purpose or heavy-duty alkali cleaners which would be well known to a person of ordinary skill in the art. Examples of particularly desirable alkali cleaners include a general purpose alkali cleaner marketed by Carroll Company under the trade name Blue Gold R Industrial Cleaner, which is or contains a diethylene glycol monobutyl ether, and a heavy-duty alkali cleaner marketed by Turco Products, Inc. under the trade name Turco 4181 which is or contains sodium hydroxide. Of course, other alkali cleaners would be suitable as well.

EXAMPLE

In this example several pairs of blocks were fabricated and bonded in accordance with the present invention to demonstrate bond quality. In this example, AMS5928 Crush Blocks were utilized, which comprise titanium alloy having 6% weight vanadium and 4% weight aluminum. A first pair, block A, was prepared for bonding with no anodizing step, and therefore no oxide layer, while three pairs (blocks B–D) were treated using the anodizing step (BEA), and were then treated with alkali wash followed by tap water or city water washing, without an acid backstrip or pickling step. Thus, these blocks still had the oxide layer from the anodizing step.

Following bonding, the bonded blocks were cut and analyzed using MCL analysis. No differences in bond quality could be detected between the parts. These components were also subjected to crush testing, and Table 1 below sets forth results of same.

TABLE 1

| COMPONENTS | % CRUSH | % BOND QUALITY |
|---|---|---|
| Block A no (BEA) | 9.3% | 99.9% |
| B (BEA) | 8.3% | 98.9% |
| C (BEA) | 9.1% | 99.4% |
| D (BEA) | 9.9% | 98.9% |

As shown the components that were anodized (Blocks B–D), so as to provide a heavy oxide layer before bonding, did show a slight decrease in bond quality as compared to the components which did not have the oxide layer (Block A). However, the most stringent requirements for any blade location are 98% bond quality, and each of blocks B–D showed bond quality significantly higher than this requirement. Thus, the method of the present invention provides suitable bond quality while substantially reducing the amount of undesirable method byproducts and the like as discussed thoroughly above.

It should readily be appreciated that the present invention provides a method for bonding components such as titanium fan blade components and the like which eliminates conventionally required steps and provides suitable bond quality while reducing the amount of environmentally-undesirable waste products, and reducing equipment and material costs as well.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed:

1. A method for bonding metal components comprising the steps of:

providing metal components to be bonded together at contacting surfaces, said contacting surfaces having an oxide layer;

washing said components with an alkali solution to provide alkali-washed components having said oxide layer at said surfaces;

washing said alkali-washed components with water to provide water-washed components having said oxide layer at said surfaces; and bonding said components together at said surfaces.

2. The method of claim 1, wherein said providing step comprises the step of anodizing said metal components so as provide said metal components having said oxide layer.

3. The method of claim 1, wherein said providing step comprises machining said components, anodizing said components to provide anodized components, etching said anodizing components with acid so as to provide etched components, and washing said etched components with water so as to provide said components having said oxide layer.

4. The method of claim 1, wherein said components are hollow blade components.

5. The method of claim 1, wherein said metal components are titanium components.

6. The method of claim 5, wherein said titanium components are titanium alloy containing vanadium and aluminum.

7. The method of claim 1, wherein said bonding step is a diffusion bonding step.

8. The method of claim 1, wherein said bonding step provides a bond between said surfaces having a bond quality of at least 98.0%.

9. The method of claim 1, wherein said bonding step provides a bond between said surfaces having a bond quality of at least 99.0%.

10. The method of claim 1, wherein said step of washing said alkali-washed components with water comprises washing said alkali-washed components with tap water.

\* \* \* \* \*